US011753540B2

(12) United States Patent
Tanaka

(10) Patent No.: US 11,753,540 B2
(45) Date of Patent: Sep. 12, 2023

(54) RESIN COMPOSITION

(71) Applicant: SUMITOMO CHEMICAL COMPANY, LIMITED, Tokyo (JP)

(72) Inventor: Masaaki Tanaka, Tokyo (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/963,361

(22) PCT Filed: Jan. 28, 2019

(86) PCT No.: PCT/JP2019/002753
§ 371 (c)(1),
(2) Date: Jul. 20, 2020

(87) PCT Pub. No.: WO2019/151184
PCT Pub. Date: Aug. 8, 2019

(65) Prior Publication Data
US 2021/0061992 A1 Mar. 4, 2021

(30) Foreign Application Priority Data
Jan. 31, 2018 (JP) .................................. 2018-015859

(51) Int. Cl.
*C08L 67/03* (2006.01)
*C08K 3/36* (2006.01)
*C08K 7/28* (2006.01)

(52) U.S. Cl.
CPC ................ *C08L 67/03* (2013.01); *C08K 3/36* (2013.01); *C08K 7/28* (2013.01); *C08K 2201/005* (2013.01); *C08L 2201/08* (2013.01); *C08L 2203/30* (2013.01)

(58) Field of Classification Search
CPC .............. C08L 67/03; C08K 3/36; C08K 7/28
See application file for complete search history.

(56) References Cited

U.S. PATENT DOCUMENTS

| 2001/0012862 | A1 | 8/2001 | Maeda |
| 2002/0028859 | A1 | 3/2002 | Maeda |
| 2002/0193533 | A1* | 12/2002 | Kamo ..................... B29C 48/40 |
| | | | 525/397 |
| 2004/0241443 | A1 | 12/2004 | Decker et al. |
| 2010/0230637 | A1 | 9/2010 | Iwase et al. |
| 2011/0223380 | A1 | 9/2011 | Ogawa et al. |
| 2012/0241688 | A1 | 9/2012 | Hara et al. |
| 2012/0252955 | A1 | 10/2012 | Sekimura et al. |
| 2015/0099827 | A1 | 4/2015 | Hagiwara et al. |
| 2016/0130425 | A1 | 5/2016 | Yoshitake et al. |
| 2017/0210950 | A1 | 7/2017 | Heimink et al. |

FOREIGN PATENT DOCUMENTS

| CN | 1408816 A | 4/2003 |
| CN | 101845203 A | 9/2010 |
| CN | 102690503 A | 9/2012 |
| CN | 102731972 A | 10/2012 |
| CN | 104334595 A | 2/2015 |
| CN | 105308123 A | 2/2016 |
| CN | 105579529 A | 5/2016 |
| JP | 2001-031848 A | 2/2001 |
| JP | 2001-172479 A | 6/2001 |
| JP | 2001-310323 A | 11/2001 |
| JP | 2002-249732 A | 9/2002 |
| JP | 2003-073560 A | 3/2003 |
| JP | 2003-313504 A | 11/2003 |
| JP | 2004-162070 A | 6/2004 |
| JP | 2004-307788 A | 11/2004 |
| JP | 2006-518416 A | 8/2006 |
| JP | 2007-112882 A | 5/2007 |
| JP | 2011-127062 A | 6/2011 |
| JP | 2011-190290 A | 9/2011 |
| JP | 2012-166977 A | 9/2012 |
| JP | 2017-524045 A | 8/2017 |
| KR | 10-2000-0055397 A | 9/2000 |
| KR | 10-2016-0077500 A | 7/2016 |

OTHER PUBLICATIONS

International Search Report issued in corresponding International Patent Application No. PCT/JP2019/002753, dated Apr. 16, 2019, with English translation.
J. Hongge et al., "Plastic Processing Technology", Harbin Institute of Technology Press, Jun. 2013, p. 279, with English translation.
Chinese First Office Action issued in corresponding Chinese Patent Application No. 201980010242.X, dated Sep. 3, 2021, with English translation.
Chinese Second Office Action issued in corresponding Chinese Patent Application No. 201980010242.X, dated Mar. 22, 2022, with English translation.
Chinese Third Office Action issued in corresponding Chinese Patent Application No. 201980010242.X, dated Jun. 29, 2022, with English translation.
Taiwanese Office Action issued in corresponding Taiwanese Patent Application No. 108103315, dated Jul. 12, 2022, with English translation.
Wang Xuman et al., "High Molecular Nanocomposites", Aug. 31, 2017, pp. 97-100, with English translation.
Japanese Office Action issued in corresponding Japanese Patent Application No. 2019-569095, dated Oct. 18, 2022, with English translation.
Chinese Office Action issued in corresponding Chinese Patent Application No. 201980010242.X, dated Nov. 18, 2022, with English translation.

(Continued)

*Primary Examiner* — Arrie L Reuther
(74) *Attorney, Agent, or Firm* — McDermott Will & Emery LLP

(57) ABSTRACT

A resin composition including a thermoplastic resin, glass balloons, and silica particles, wherein a ratio of a content of the glass balloons is 10% by mass or more and 30% by mass or less when a total content of the thermoplastic resin and the glass balloons is 100% by mass, and a ratio of a content of the silica particles is 0.02 parts by mass or more and 5 parts by mass or less when the total content of the thermoplastic resin and the glass balloons is 100 parts by mass.

4 Claims, No Drawings

(56) References Cited

OTHER PUBLICATIONS

Taiwanese Office Action issued in corresponding Taiwanese Patent Application No. 108103315, dated Feb. 1, 2023, with English translation.

* cited by examiner

RESIN COMPOSITION

CROSS REFERENCE

This application is the U.S. National Phase under 35 U.S.C. § 371 of International Application No. PCT/JP2019/002753, filed on Jan. 28, 2019, which claims the benefit of Japanese Application No. 2018-015859, filed on Jan. 31, 2018, the entire contents of each are hereby incorporated by reference.

TECHNICAL FIELD

The present invention relates to a resin composition.

BACKGROUND ART

Thermoplastic resins have been widely used as molding materials for various parts such as machine parts, home appliance parts, communication equipment parts, office automation (OA) parts, automobile parts, and leisure goods. In recent years, further weight reduction of these parts has been required. For this reason, for the thermoplastic resins serving as their molding materials, weight reduction has also been required while maintaining characteristics such as heat resistance.

As a means for reducing the weight of a molded product of a thermoplastic resin, a method has been known in which glass balloons are blended with the thermoplastic resin to reduce the specific gravity. For example, Patent Document 1 describes a thermoplastic resin composition having a low specific gravity. The thermoplastic resin composition described in Patent Document 1 contains a polycarbonate resin, a polybutylene terephthalate resin, and glass balloons.

CITATION LIST

Patent Documents

[Patent Document 1] JP2011-127062A

SUMMARY OF THE INVENTION

Problems to be Solved by the Invention

However, the resin composition as described in Patent Document 1 does not have a sufficient adhesive strength between molded products adhered via an adhesive (hereinafter referred to as "adhesive strength of molded products"). Therefore, it is required to improve the adhesive strength of molded products.

The present invention has been made in view of such circumstances, with an object of providing a resin composition having a low specific gravity and capable of forming a molded product having a high adhesive strength.

Means to Solve the Problems

In order to solve the above problems, the present invention includes the following aspects.
[1] A resin composition including a thermoplastic resin, glass balloons, and
silica particles,
wherein a ratio of a content of the aforementioned glass balloons is 10% by mass or more and 30% by mass or less when a total content of the aforementioned thermoplastic resin and the aforementioned glass balloons is 100% by mass, and
a ratio of a content of the silica particles is 0.02 parts by mass or more and 5 parts by mass or less when a total content of the aforementioned thermoplastic resin and the aforementioned glass balloons is 100 parts by mass.
[2] The resin composition according to [1], wherein an arithmetic average particle size of primary particles of the aforementioned silica particles is 7 nm or more and 2,000 nm or less.
[3] The resin composition according to [1] or [2], wherein an arithmetic average particle size of the aforementioned glass balloons is 5 μm or more and 500 μm or less.
[4] The resin composition according to any one of [1] to [3], wherein the aforementioned thermoplastic resin is a liquid crystalline polyester.

Effects of the Invention

According to an aspect of the present invention, there is provided a resin composition having a low specific gravity and capable of forming a molded product having a high adhesive strength.

EMBODIMENTS FOR CARRYING OUT THE INVENTION

<Resin Composition>

A resin composition of the present embodiment contains a thermoplastic resin, glass balloons, and silica particles.

It should be noted that in the present specification, a mixture obtained by mixing a thermoplastic resin, glass balloons, and silica particles will be referred to as a "resin composition". In addition, a material obtained by forming the obtained mixture into a pellet is also referred to as a "resin composition" in the same manner.

[Thermoplastic Resin]

Examples of the thermoplastic resin contained in the resin composition of the present embodiment include liquid crystalline polyesters, polybutylene terephthalate resins, polyethylene terephthalate resins, polyphenylene sulfide resins, polyether ether ketone resins, polycarbonate resins, polysulfone resins, polyethersulfone resins and polyetherimide resins.

The resin composition of the present embodiment may contain only one type of the above-mentioned thermoplastic resin, or may contain two or more types thereof in any combination.

Among the above-mentioned thermoplastic resins, liquid crystalline polyesters are preferable. Since liquid crystalline polyesters have low viscosities when melted, the shear applied to the glass balloons during melt kneading or molding can be reduced. As a result, breakage of the glass balloons during melt-kneading or molding can be suppressed. In one aspect, it is preferable that the thermoplastic resin according to the present embodiment is composed only of a liquid crystalline polyester.

It is preferable that the liquid crystalline polyester exhibits liquid crystallinity in a molten state and melts at a temperature of 250° C. or higher and 450° C. or lower. It should be noted that the liquid crystalline polyester may be a liquid crystalline polyester amide, a liquid crystalline polyester ether, a liquid crystalline polyester carbonate, or a liquid crystalline polyester imide. The liquid crystalline polyester is preferably a wholly aromatic liquid crystalline polyester obtained by using only an aromatic compound as a raw material monomer.

Typical examples of the liquid crystalline polyester include those obtained by polymerization (polycondensation) of an aromatic hydroxycarboxylic acid, an aromatic dicarboxylic acid, and at least one compound selected from the group consisting of an aromatic diol, an aromatic hydroxylamine and an aromatic diamine; those obtained by polymerization of a plurality of types of aromatic hydroxycarboxylic acids; those obtained by polymerization of an aromatic dicarboxylic acid and at least one compound selected from the group consisting of an aromatic diol, an aromatic hydroxylamine and an aromatic diamine; or those obtained by polymerization of a polyester such as polyethylene terephthalate and an aromatic hydroxycarboxylic acid.

In the present specification, the aromatic hydroxycarboxylic acid, the aromatic dicarboxylic acid, the aromatic diol, the aromatic hydroxylamine and the aromatic diamine may be each independently replaced partially or entirely with a polymerizable derivative thereof.

Examples of the polymerizable derivative of a compound having a carboxy group, such as an aromatic hydroxycarboxylic acid and an aromatic dicarboxylic acid, include an ester, an acid halide, or an acid anhydride. Examples of the above-mentioned ester include those obtained by converting a carboxy group into an alkoxycarbonyl group or an aryloxycarbonyl group. Examples of the above-mentioned acid halide include those obtained by converting a carboxy group into a haloformyl group. Examples of the above-mentioned acid anhydride include those obtained by converting a carboxy group into an acyloxycarbonyl group.

Examples of the polymerizable derivative of a compound having a hydroxy group, such as an aromatic hydroxycarboxylic acid, an aromatic diol and an aromatic hydroxylamine, include those obtained by acylating and converting a hydroxy group into an acyloxy group (that is, a hydroxyl group-acylated product).

Examples of the polymerizable derivative of a compound having an amino group, such as an aromatic hydroxylamine and an aromatic diamine, include those obtained by acylating and converting an amino group into an acylamino group (that is, an amino group-acylated product).

The liquid crystalline polyester according to the present embodiment preferably has a repeating unit represented by the following formula (1) (hereinafter may be referred to as "repeating unit (1)" in some cases). Further, the liquid crystalline polyester more preferably has the repeating unit (1), a repeating unit represented by the following formula (2) (hereinafter may be referred to as "repeating unit (2)" in some cases) and a repeating unit represented by the following formula (3) (hereinafter may be referred to as "repeating unit (3)" in some cases).

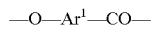  (1)

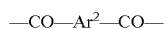  (2)

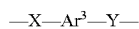  (3)

[In the formulas (1) to (3), $Ar^1$ represents a phenylene group, a naphthylene group or a biphenylylene group;

$Ar^2$ and $Ar^3$ each independently represent a phenylene group, a naphthylene group, a biphenylylene group or a group represented by the formula (4); X and Y each independently represent an oxygen atom or an imino group (—NH—); and at least one hydrogen atom in the aforementioned group represented by $Ar^1$, $Ar^2$ or $Ar^3$ may be each independently substituted with a halogen atom, an alkyl group having 1 to 10 carbon atoms or an aryl group having 6 to 20 carbon atoms.]

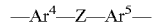  (4)

[In the formula (4), $Ar^4$ and $Ar^5$ each independently represent a phenylene group or a naphthylene group; Z represents an oxygen atom, a sulfur atom, a carbonyl group, a sulfonyl group or an alkylidene group having 1 to 10 carbon atoms;

at least one hydrogen atom in the aforementioned group represented by $Ar^4$ or $Ar^5$ may be each independently substituted with a halogen atom, an alkyl group having 1 to 10 carbon atoms or an aryl group having 6 to 20 carbon atoms.]

Examples of the halogen atom which can be substituted with a hydrogen atom include a fluorine atom, a chlorine atom, a bromine atom or an iodine atom.

Examples of the alkyl group having 1 to 10 carbon atoms which can be substituted with a hydrogen atom include a methyl group, an ethyl group, a 1-propyl group, an isopropyl group, a 1-butyl group, an isobutyl group, a sec-butyl group, a tert-butyl group, a 1-hexyl group, a 2-ethylhexyl group, a 1-octyl group and a 1-decyl group.

Examples of the aryl group having 6 to 20 carbon atoms which can be substituted with a hydrogen atom include a monocyclic aromatic group such as a phenyl group, an orthotolyl group, a metatolyl group and a paratolyl group, and a condensed aromatic group such as a 1-naphthyl group and a 2-naphthyl group.

In the aforementioned group represented by $Ar^1$, $Ar^2$, $Ar^3$, $Ar^4$ or $Ar^5$, when at least one hydrogen atom is substituted with the above-mentioned substituent, the number of the aforementioned substituents is preferably each independently 1 or 2 for each group represented by $Ar^1$, $Ar^2$, $Ar^3$, $Ar^4$ or $Ar^5$. Further, the number of the aforementioned substituents is more preferably one for each group represented by $Ar^1$, $Ar^2$, $Ar^3$, $Ar^4$ or $Ar^5$.

Examples of the alkylidene group having 1 to 10 carbon atoms include a methylene group, an ethylidene group, an isopropylidene group, a 1-butylidene group, and a 2-ethylhexylidene group.

The repeating unit (1) is a repeating unit derived from a predetermined aromatic hydroxycarboxylic acid.

It should be noted that in the present specification, the expression "derived" means that the chemical structure is changed due to polymerization of raw material monomers, while no other structural change occurs.

As the repeating unit (1), those in which $Ar^1$ is a 1,4-phenylene group (for example, a repeating unit derived from 4-hydroxybenzoic acid) or those in which $Ar^1$ is a 2,6-naphthylene group (for example, a repeating unit derived from 6-hydroxy-2-naphthoic acid) are preferable.

The repeating unit (2) is a repeating unit derived from a predetermined aromatic dicarboxylic acid.

As the repeating unit (2), those in which $Ar^2$ is a 1,4-phenylene group (for example, a repeating unit derived from terephthalic acid), those in which $Ar^2$ is a 1,3-phenylene group (for example, a repeating unit derived from isophthalic acid), those in which $Ar^2$ is a 2,6-naphthylene group (for example, a repeating unit derived from 2,6-naphthalenedicarboxylic acid), or those in which $Ar^2$ is a diphenyl ether-4,4'-diyl group (for example, a repeating unit derived from diphenyl ether-4,4'-dicarboxylic acid) are preferable.

The repeating unit (3) is a repeating unit derived from a predetermined aromatic diol, aromatic hydroxylamine or aromatic diamine.

As the repeating unit (3), those in which $Ar^3$ is a 1,4-phenylene group (for example, a repeating unit derived from hydroquinone, 4-aminophenol or 1,4-phenylenediamine), or those in which $Ar^3$ is a 4,4'-biphenylylene group (for example, a repeating unit derived from 4,4'-dihydroxybiphenyl, 4-amino-4'-hydroxybiphenyl or 4,4'-diaminobiphenyl) are preferable.

The content of the repeating unit (1) in the liquid crystalline polyester is preferably 30 mol % or more, more preferably 30 mol % or more and 80 mol % or less, still more preferably 30 mol % or more and 70 mol % or less, and particularly preferably 35 mol % or more and 65 mol % or less, with respect to the total amount of all the repeating units constituting the liquid crystalline polyester.

Here, the total amount of all the repeating units constituting the liquid crystalline polyester is a value obtained by dividing the mass of each repeating unit constituting the liquid crystalline polyester by the formula weight of each repeating unit, determining the equivalents (mol) of the amounts of substances of each repeating unit and summing them up.

When the content of the repeating unit (1) in the liquid crystalline polyester is 30 mol % or more, the strength and rigidity of the molded product formed from the resin composition of the present embodiment are easily improved. Further, when the content of the repeating unit (1) is 80 mol % or less, the melt viscosity can be lowered. Therefore, the temperature required for molding the resin composition of the present embodiment tends to be low.

The content of the repeating unit (2) in the liquid crystalline polyester is preferably 35 mol % or less, more preferably 10 mol % or more and 35 mol % or less, still more preferably 15 mol % or more and 35 mol % or less, and particularly preferably 17.5 mol % or more and 32.5 mol % or less with respect to the total amount of all the repeating units constituting the liquid crystalline polyester.

The content of the repeating unit (3) in the liquid crystalline polyester is preferably 35 mol % or less, more preferably 10 mol % or more and 35 mol % or less, still more preferably 15 mol % or more and 35 mol % or less, and particularly preferably 17.5 mol % or more and 32.5 mol % or less with respect to the total amount of all the repeating units constituting the liquid crystalline polyester.

In one aspect, in the liquid crystalline polyester according to the present embodiment, the content of the repeating unit (1) is preferably 30 mol % or more, more preferably 30 mol % or more and 80 mol % or less, still more preferably 30 mol % or more and 70 mol % or less, and particularly preferably 35 mol % or more and 65 mol % or less; the content of the repeating unit (2) is preferably 35 mol % or less, more preferably 10 mol % or more and 35 mol % or less, still more preferably 15 mol % or more and 35 mol % or less, and particularly preferably 17.5 mol % or more and 32.5 mot % or less; and the content of the repeating unit (3) is preferably 35 mol % or less, more preferably 10 mol % or more and 35 mol % or less, still more preferably 15 mol % or more and 35 mol % or less, and particularly preferably 17.5 mol % or more and 32.5 mol % or less with respect to the total amount of all the repeating units constituting the liquid crystalline polyester.

In the liquid crystalline polyester according to the present embodiment, the ratio of the content of the repeating unit (2) to the content of the repeating unit (3) represented by the formula: [content of the repeating unit (2)]/[content of the repeating unit (3)](mol/mol) is preferably from 0.9/1 to 1/0.9, more preferably from 0.95/1 to 1/0.95, and still more preferably from 0.98/1 to 1/0.98.

It should be noted that the liquid crystalline polyester according to the present embodiment may have two or more types of repeating units (1) to (3), independently of each other. Further, the liquid crystalline polyester according to the present embodiment may have one or more types of repeating units other than the repeating units (1) to (3). The content of the repeating units other than the repeating units (1) to (3) is preferably 0 mol % or more and 10 mol % or less, and more preferably 0 mol % or more and 5 mol % or less with respect to the total amount of all the repeating units constituting the liquid crystalline polyester.

The liquid crystalline polyester according to the present embodiment preferably has a repeating unit (3) in which X and Y each represent an oxygen atom. That is, the liquid crystalline polyester preferably has a repeating unit derived from a predetermined aromatic diol as the repeating unit (3). As a result, the melt viscosity of the liquid crystalline polyester tends to be low.

Further, it is more preferable that the liquid crystalline polyester include only those in which X and Y each represent an oxygen atom as the repeating unit (3).

The liquid crystalline polyester according to the present embodiment is preferably produced by melt polymerization of a raw material monomer corresponding to the repeating unit constituting the liquid crystalline polyester and solid phase polymerization of the obtained polymer (hereinafter sometimes referred to as "prepolymer"). As a result, a high molecular weight liquid crystalline polyester having high heat resistance, strength and rigidity can be produced with favorable operability.

The above-mentioned melt polymerization may be carried out in the presence of a catalyst. Examples of the catalyst include metal compounds such as magnesium acetate, stannous acetate, tetrabutyl titanate, lead acetate, sodium acetate, potassium acetate and antimony trioxide, and nitrogen-containing heterocyclic compounds such as 4-(dimethylamino)pyridine and 1-methylimidazole. Among them, a nitrogen-containing heterocyclic compound is preferably used as the catalyst used in the above-mentioned melt polymerization.

The flow starting temperature of the liquid crystalline polyester is preferably 250° C. or higher, more preferably 270° C. or higher and 400° C. or lower, and still more preferably 280° C. or higher and 380° C. or lower. The higher the flow starting temperature, the easier the heat resistance, strength and rigidity are improved. However, if it is too high, the melt temperature and melt viscosity tend to increase, and the temperature required for molding tends to increase.

That is, when the flow starting temperature is within the above range, the heat resistance, strength and rigidity are easily improved, and it is easy to adjust the melt temperature and the melt viscosity so as to be suitable for molding.

It should be noted that the flow starting temperature is also referred to as flow temperature or fluidity temperature and serves as an indicator of the molecular weight of a liquid crystalline polyester, which is a temperature where a viscosity of 4,800 Pa·s (48,000 poise) is exhibited when the liquid crystalline polyester is melted and extruded from a nozzle having an inner diameter of 1 mm and a length of 10 mm, while raising the temperature at a rate of 4° C./min under a load of 9.8 MPa (100 kg/cm$^2$) using a capillary rheometer (see "Liquid Crystalline Polymer—Synthesis, Molding, and Application—" edited by Naoyuki Koide, p. 95, CMC Publishing Co., Ltd., published on Jun. 5, 1987).

In one aspect, the resin composition of the present embodiment preferably contains a thermoplastic resin in an amount of 70% by mass or more and 90% by mass or less with respect to the total mass of the resin composition.

[Glass Balloons]

Glass balloons are spherical particles made of glass and have voids inside. In one aspect, examples of glass balloon materials include borosilicate glass, quartz glass, soft glass, soda-lime glass, lead glass and aluminosilicate glass.

The "spherical particles" referred to here do not have to be perfect spheres, and may be particles with a sphericity of 0.3 to 1.0, for example.

In the resin composition of the present embodiment, when the total content of the thermoplastic resin and the glass balloons is 100% by mass, the ratio of the content of the glass balloons is 10% by mass or more and 30% by mass or less.

When the ratio of the content of the glass balloons with respect to the total content of the thermoplastic resin and the glass balloons is 10% by mass or more, the specific gravity of the obtained molded product can be suppressed to a sufficiently low level. Further, when the thermoplastic resin is a liquid crystalline polyester, if the ratio of the content of the glass balloons with respect to the total content of the thermoplastic resin and the glass balloons is 10% by mass or more, the orientation of the liquid crystalline polyester can be sufficiently suppressed.

On the other hand, when the ratio of the content of the glass balloons with respect to the total content of the thermoplastic resin and the glass balloons is 30% by mass or less, it is easy to uniformly disperse the glass balloons in the thermoplastic resin at the time of producing the resin composition. Further, when the content of the glass balloons with respect to the total content of the thermoplastic resin and the glass balloons is 30% by mass or less, the resin composition has sufficiently high fluidity when melted and is excellent in moldability.

Furthermore, when the ratio of the content of the glass balloons with respect to the total content of the thermoplastic resin and the glass balloons is within the above range, since the resin composition has sufficiently high fluidity when melted, the stress applied to the glass balloons at the time of melt-kneading or molding can be reduced. As a result, crushing of the glass balloons during melt-kneading or molding can be suppressed. Therefore, the specific gravity of the molded product of the resin composition can be suppressed to a sufficiently low level.

The ratio of the content of the glass balloons with respect to the total content (100% by mass) of the thermoplastic resin and the glass balloons is preferably 15% by mass or more and 30% by mass or less, more preferably 15% by mass or more and 25% by mass or less, and still more preferably 20% by mass or more and 25% by mass or less.

In one aspect, the resin composition of the present embodiment preferably contains glass balloons in an amount of 10 to 30% by mass with respect to the total mass of the resin composition.

The arithmetic average particle size of the glass balloons is preferably equal to or greater than 5 μm, and more preferably equal to or greater than 10 μm. When the arithmetic average particle size of the glass balloons is equal to or greater than 5 μm, the particle size distribution of the glass balloons does not become too narrow. As a result, the bulk density of the glass balloons tends to increase due to glass balloon particles having a small particle size entering the gaps between the glass balloon particles.

When such glass balloons are used, at the time of producing the resin composition, when the total content of the thermoplastic resin and the glass balloons is 100% by mass, it is easy to adjust the ratio of the content of the glass balloons to 15% by mass or more and 30% by mass or less, and more preferably to 15% by mass or more and 25% by mass or less. Therefore, when the arithmetic average particle size of the glass balloons is equal to or greater than 5 μm, the obtained resin composition can be easily molded. Further, when the thermoplastic resin is a liquid crystalline polyester, if the arithmetic average particle size of the glass balloons is equal to or greater than 5 μm, the orientation of the liquid crystalline polyester can be sufficiently suppressed. As a result, the obtained resin composition can be easily molded.

In addition, for example, when assuming that the volume distribution of glass balloon raw materials before foaming (unfoamed bodies) is narrow, if the arithmetic average particle size of the glass balloons is equal to or greater than 5 μm, it can be said that the foaming ratio of the glass balloons with respect to the glass balloon raw materials is sufficiently high. When such glass balloons are used, the specific gravity of the molded product of the resin composition can be suppressed to a sufficiently low level.

Further, the arithmetic average particle size of the glass balloons is preferably equal to or less than 500 μm, and more preferably equal to or less than 200 μm. Furthermore, when the arithmetic average particle size of the glass balloons is equal to or less than 500 μm, crushing of the glass balloons during melt-kneading can be suppressed. As a result, the specific gravity of the molded product of the resin composition can be suppressed to a sufficiently low level. Further, it is possible to suppress the pin gate and thinning portion of a mold to be used from being blocked by the glass balloons during molding of the resin composition. As a result, it is possible to obtain a molded product in which the occurrence of short shots is suppressed.

In one aspect, the arithmetic average particle size of the glass balloons is preferably 5 μm or more and 500 μm or less, more preferably 10 μm or more and 200 μm or less, and particularly preferably 50 μm or more and 70 μm or less.

Based on the cumulative volume distribution diagram of the particle size distribution of the glass balloons, the particle size at a cumulative percentage of 10% from the small diameter side (sometimes abbreviated as D10) is preferably equal to or greater than 5 μm, and more preferably equal to or greater than 10 μm. D10 of the glass balloons is preferably equal to or less than 30 μm, and more preferably equal to or less than 25 μm.

In one aspect, D10 of the glass balloons is preferably 5 μm or more and 30 μm or less, more preferably 10 μm or more and 25 μm or less, and particularly preferably 20 μm or more and 22 μm or less.

Based on the cumulative volume distribution diagram of the particle size distribution of the glass balloons, the particle size at a cumulative percentage of 50% from the small diameter side (sometimes abbreviated as D50) is preferably equal to or greater than 5 μm, and more preferably equal to or greater than 10 μm. D50 of the glass balloons is preferably equal to or less than 200 μm, and more preferably equal to or less than 100 μm.

In one aspect, D50 of the glass balloons is preferably 5 μm or more and 200 μm or less, more preferably 10 μm or more and 100 μm or less, and particularly preferably 40 μm or more and 50 μm or less.

Based on the cumulative volume distribution diagram of the particle size distribution of the glass balloons, the particle size at a cumulative percentage of 90% from the small diameter side (sometimes abbreviated as D90) is preferably equal to or greater than 35 μm, and more preferably equal to or greater than 40 μm. D90 of the glass balloons is preferably equal to or less than 180 μm, and more preferably equal to or less than 170 km.

In one aspect, D90 of the glass balloons is preferably 35 μm or more and 180 μm or less, more preferably 40 μm or more and 170 μm or less, and particularly preferably 100 μm or more and 160 μm or less.

The value of D90/D10 in the glass balloons is preferably 1 or more and 36 or less, more preferably 1 or more and 17 or less, still more preferably 1.6 or more and 10 or less, and particularly preferably 2.2 or more and 8 or less. When the value of D90/D10 in the glass balloons is 10 or less, it can be said that the particle size distribution of the glass balloons is sufficiently narrow and that the particle sizes of the glass balloons are uniform on the whole. As a result, the specific gravity of the molded product of the obtained resin composition can be made uniform on the whole regardless of the measurement position.

The upper limit values and lower limit values of the arithmetic average particle size, D10, D50 and D90 of the glass balloons can be arbitrarily combined.

In the present specification, values measured as described below can be adopted as the arithmetic average particle sizes, and D10, D50 and D90 values of the glass balloons contained in the resin composition and the glass balloons before mixing.

5 g of a pellet or molded product composed of a resin composition containing a thermoplastic resin, glass balloons and silica particles is heated in air at 500° C. for 3 hours using an electric furnace, and then further heated at 550° C. for 8 hours to remove the resin component. A particle size distribution of the glass balloons is obtained in a state where the obtained glass balloons are dispersed in water using a laser diffraction/scattering type particle size distribution measuring device ("LA-950" manufactured by Horiba, Ltd.). The arithmetic average particle size of the glass balloons is calculated based on the cumulative volume distribution diagram of the particle size distribution of the obtained glass balloons.

Based on the cumulative distribution diagram of the particle size distribution of the obtained glass balloons, the particle size at a cumulative percentage of 10% (D10), the particle size at a cumulative percentage of 50% (D50), and the particle size at a cumulative percentage of 90% (D90) from the small diameter side are calculated.

The arithmetic average particle size, and D10, D50 and D90 values of the glass balloons before mixing are measured and calculated in the same manner as described above except that the ashing treatment in the electric furnace is not performed.

It should be noted that the particle size range of the particles for which the particle size distribution of the glass balloons is obtained in the above measurement was set to 1 μm or more and 1,000 μm or less.

It should be noted that in the cumulative volume distribution diagram of the particle size distribution obtained by the above measurement, when the particle size distribution of the glass balloons and the particle size distribution of silica overlap, the arithmetic average particle size of the glass balloons can be determined by combining the TEM image and EDX measurement result described later.

In the present specification, the amount of voids contained in the glass balloons can be expressed by the hollow volume ratio shown by the following formula (S1).

$$\text{Hollow volume ratio (\%)} = 100 \times (1 - \rho_1/\rho_2) \quad (S1)$$

(In the formula (S1), $\rho_1$ represents the apparent specific gravity of the glass balloons, and $\rho_2$ represents the material specific gravity (the so-called true specific gravity) of the glass balloons.)

In the present specification, a value measured by a gas replacement method is employed as the apparent specific gravity pi of the glass balloons.

In the present specification, the nominal value provided by the manufacturer is employed as the material specific gravity $\rho_2$ of the glass balloons. Further, in another aspect, the material specific gravity $\rho_2$ of the glass balloons may be measured by crushing the glass balloons in a mortar and then measuring the crushed material using a pycnometer.

The hollow volume ratio of the glass balloons is preferably 60% or more. When the hollow volume ratio of the glass balloons is 60% or more, the specific gravity of the molded product of the obtained resin composition can be suppressed to a sufficiently low level. Further, the hollow volume ratio of the glass balloons is preferably 80% or less. When the hollow volume ratio of the glass balloons is 80% or less, the thickness of the glass balloons is sufficiently large and the pressure resistance of the glass balloons is sufficiently high. As a result, crushing of the glass balloons during melt-kneading or molding can be suppressed.

In one aspect, the hollow volume ratio of the glass balloons is preferably 60% or more and 80% or less.

In the present specification, the strength of the glass balloons can be expressed by using the pressure resistance. A value measured in accordance with ASTM D3102-72 (Hydrostatic Collapse Strength of Hollow Glass Microspheres) can be employed as the pressure resistance of the glass balloons.

The pressure resistance of the glass balloons is preferably 20 MPa or higher, more preferably 50 MPa or higher, and still more preferably 80 MPa or higher. When the pressure resistance of the glass balloons is 20 MPa or higher, crushing of the glass balloons during melt-kneading or molding can be suppressed. As a result, the specific gravity of the molded product of the resin composition can be suppressed to a sufficiently low level.

The pressure resistance of the glass balloons may be 200 MPa or less.

In one aspect, the pressure resistance of the glass balloons is preferably 20 MPa or more and 200 MPa or less, more preferably 50 MPa or more and 200 MPa or less, and still more preferably 80 MPa or more and 200 MPa or less.

[Silica Particles]

In the resin composition of the present embodiment, glass balloons and silica particles are made to coexist for the purpose of improving the adhesive strength of the molded product.

Compared with a conventional resin composition in which silica particles are blended with a thermoplastic resin (that is, a conventional resin composition containing no glass balloons), in the resin composition of the present embodiment in which glass balloons and silica particles are made to coexist, it is presumed that the silica particles are more dispersed in the thermoplastic resin. It is considered that this increases the amount of silica particles present on the surface of the molded product formed from the resin composition, and increases the reactive groups such as hydroxy groups contained in the silica particles on the surface of the molded product. As a result, in the resin composition of the present embodiment, it is considered that the effect of improving the adhesive strength by the silica particles is obtained more remarkably than the conventional resin composition.

The silica particles contained in the resin composition of the present embodiment may be crystalline silica or amorphous silica, but amorphous silica is preferable.

The silica particles according to the resin composition of the present embodiment may include surface-treated silica particles. The surface treatment agent used for the surface treatment of the silica particles is not particularly limited, and known surface treatment agents can be mentioned. Examples of the surface treatment agent include hexamethyldisilazane, octamethylcyclotetrasiloxane, dimethylpolysiloxane and methacryloxysilane. One type of these surface treatment agents may be used alone, or two or more types thereof may be used in combination.

The resin composition of the present embodiment contains 0.02 parts by mass or more and 5 parts by mass or less of silica particles when the total content of the thermoplastic resin and the glass balloons is 100 parts by mass.

When the ratio of the content of the silica particles is 0.02 parts by mass or more, a resin composition capable of exhibiting sufficiently high adhesive strength can be obtained.

On the other hand, when the ratio of the content of the silica particles is 5 parts by mass or less, it is easy to uniformly disperse the silica particles in the thermoplastic resin at the time of producing the resin composition. In addition, when the ratio of the content of the silica particles is 5 parts by mass or less, the resin composition has sufficiently high fluidity when melted and is excellent in moldability. Furthermore, since the resin composition has sufficiently high fluidity when melted, the stress applied to the glass balloons at the time of melt-kneading or molding can be reduced, and crushing of the glass balloons can be suppressed.

The ratio of the content of the silica particles is preferably 0.02 parts by mass or more, more preferably 0.10 parts by mass or more, and still more preferably 0.4 parts by mass or more when the total content of the thermoplastic resin and the glass balloons is 100 parts by mass. Further, the ratio of the content of the silica particles is preferably 5 parts by mass or less, and more preferably 2 parts by mass or less, when the total content of the thermoplastic resin and the glass balloons is 100 parts by mass.

The upper limit value and lower limit value of the content of the silica particles can be arbitrarily combined.

In one aspect, the ratio of the content of the silica particles is preferably 0.02 parts by mass or more and 5 parts by mass or less, more preferably 0.10 parts by mass or more and 5 parts by mass or less, still more preferably 0.4 parts by mass or more and 5 parts by mass or less, and particularly preferably 0.4 parts by mass or more and 2 parts by mass or less, when the total content of the thermoplastic resin and the glass balloons is 100 parts by mass.

The arithmetic average particle size of the primary particles of the silica particles contained in the resin composition of the present embodiment is preferably 7 nm or more and 2,000 nm or less.

When the arithmetic average particle size of the primary particles of the silica particles is 7 nm or more, it is easy to increase the adhesive strength of the molded product of the obtained resin composition even when a small amount of silica particles is added. When the arithmetic average particle size of the primary particles of the silica particles is 2,000 nm or less, it is considered that since the surface area with the same mass increases, the adhesive strength of the molded product of the obtained resin composition increases.

The arithmetic average particle size of the primary particles of the silica particles is preferably equal to or greater than 20 nm, and more preferably equal to or greater than 50 nm. When the arithmetic average particle size of the primary particles of the silica particles is 20 nm or more, the silica particles are easily dispersed. Further, even when a small amount of silica particles is added, the adhesive strength of the molded product of the obtained resin composition becomes sufficiently high. Furthermore, the silica particles are easy to handle as a powder.

The arithmetic average particle size of the primary particles of the silica particles is preferably equal to or less than 1,000 nm, and more preferably equal to or less than 400 nm. When the arithmetic average particle size of the primary particles of the silica particles is 1,000 nm or less, it is considered that since the surface area per unit mass (specific surface area) is sufficiently large, the adhesive strength of the molded product of the obtained resin composition becomes sufficiently high. Therefore, the added amount of silica required for obtaining the same adhesive strength can be reduced.

In one aspect, the arithmetic average particle size of the primary particles of the silica particles is preferably 20 nm or more and 1,000 nm or less, and more preferably 50 nm or more and 400 nm or less.

Based on the cumulative volume distribution diagram of the particle size distribution of the silica particles, the particle size at a cumulative percentage of 10% from the small diameter side (sometimes abbreviated as D10') is preferably 1 nm or more, and more preferably 3 nm or more. D10' of the silica particles is preferably equal to or less than 1,700 nm, and more preferably equal to or less than 500 nm. In one aspect, D10' of the silica particles is preferably 1 nm or more and 1700 nm or less, and more preferably 3 nm or more and 500 nm or less. In another aspect, D10' of the silica particles may be 4 nm or more and 1700 nm or less, or may be 4 nm or more and 23 nm or less.

Based on the cumulative volume distribution diagram of the particle size distribution of the silica particles, the particle size at a cumulative percentage of 50% from the small diameter side (sometimes abbreviated as D50') is preferably equal to or greater than 7 nm, and more preferably equal to or greater than 20 m. D50' of the silica particles is preferably equal to or less than 2,000 µm, and more preferably equal to or less than 1,000 nm.

In one aspect, D50' of the silica particles is preferably 7 nm or more and 2,000 nm or less, and more preferably 20 nm or more and 1,000 nm or less. In another aspect, D50' of the silica particles may be 8 nm or more and 2,000 nm or less, or may be 8 nm or more and 51 nm or less.

Based on the cumulative volume distribution diagram of the particle size distribution of the silica particles, the particle size at a cumulative percentage of 90% from the small diameter side (sometimes abbreviated as D90') is preferably equal to or greater than 10 nm, and more preferably equal to or greater than 70 nm. D90' of the silica particles is preferably equal to or less than 2,500 nm, and more preferably equal to or less than 1,800 nm.

In one aspect, D90' of the silica particles is preferably 10 nm or more and 2,500 nm or less, and more preferably 70 nm or more and 1,800 nm or less. In another aspect, D90' of the silica particles may be 12 nm or more and 2,228 nm or less, or may be 12 nm or more and 95 nm or less.

The value of D90'/D10' in the silica particles is preferably 10 or less, more preferably 0.1 or more and 8.0 or less, and still more preferably 1.0 or more and 5.0 or less. When the value of D90'/D10' in the silica particles is 10 or less, it can be said that the particle size distribution of the silica particles is sufficiently narrow and that the particle sizes of the silica particles are uniform on the whole. As a result, the adhesive strength of the molded product of the obtained resin composition can be made uniform on the whole regardless of the position of the molded product.

The upper limit values and lower limit values of the arithmetic average particle size, D10', D50' and D90' of the silica particles can be arbitrarily combined.

In the present specification, values measured as described below are adopted as the arithmetic average particle sizes, and D10', D50' and D90' values of the silica particles contained in the resin composition and the silica particles before mixing.

In the present specification, by selecting 100 or more particles (for example, 474 or 490 particles) at random from particles observed in an image of a transmission electron microscope (sometimes abbreviated as TEM), the arithmetic average particle size of the primary particles of the silica particles before mixing can be obtained from an average value of the particle sizes (Feret diameters) of the selected particles.

In addition, when it is known in advance that the particle size of the silica particles exceeds 100 nm, the arithmetic average particle size of the primary particles of the silica particles before mixing can be determined in the same manner as the arithmetic average particle size of the glass balloons by using a laser diffraction/scattering type particle size distribution measuring device ("LA-950" manufactured by Horiba, Ltd.).

Further, based on the cumulative distribution diagram of the particle size distribution of the silica particles obtained by using the laser diffraction/scattering type particle size distribution measuring device, the particle size at a cumulative percentage of 10% (D10'), the particle size at a cumulative percentage of 50% (D50'), and the particle size at a cumulative percentage of 90% (D90') from the small diameter side can be calculated.

It should be noted that the particle size range of the particles for which the particle size distribution of the silica particles was obtained in the above measurement was set to 0.01 µm or more and 10 µm or less.

In one aspect, the arithmetic average particle size of the primary particles of the silica particles is preferably 7 nm or more and 100 nm or less, or more than 100 nm and 2,000 nm or less, more preferably 20 nm or more and 100 nm or less, or more than 100 nm and 1,000 nm or less, and particularly preferably 50 nm or more and 100 nm or less, or more than 100 nm and 400 nm or less.

In another aspect, the arithmetic average particle size of the primary particles of the silica particles contained in the resin composition can be obtained from a combination of a transmission electron microscope (TEM) image and measurement results of energy dispersive X-ray analysis (sometimes abbreviated as EDX).

First, 5 g of a pellet or molded product composed of a resin composition containing a thermoplastic resin, glass balloons and silica particles is heated in air at 500° C. for 3 hours using an electric furnace, and then further heated at 550° C. for 8 hours to remove the resin component.

Next, the mixture containing the remaining glass balloons and silica particles is dispersed in ethanol using ultrasonic waves, and then the ethanol dispersion liquid of the mixture is added dropwise on a grid with a support film for TEM observation to prepare a sample for observation. At this time, the above dispersion liquid may be passed through a sieve of about 30 µm to remove large particles of glass balloons.

Next, an image of the sample for observation prepared using a TEM (JEM2200FS manufactured by JEOL Ltd.) is taken. The particles on this image are subjected to elemental analysis of Si, O, and Ca of the sample for observation using EDX. The particles in which Ca is detected by EDX are considered to be particles derived from glass balloons. For this reason, the particles in which Ca is detected are excluded from the target of observation. It is possible to randomly select 100 or more particles (for example, 474 or 490 particles) in which only Si and O are detected by EDX, and to use an average value of particle sizes (Feret diameters) of the selected particles as the arithmetic average particle size of the primary particles of the silica particles.

When specifying the size of the silica particles, it is also possible to use the specific surface area of the silica particles instead of the arithmetic average particle size of the primary particles of the silica particles. The specific surface area of the silica particles can be measured by the BET method.

The specific surface area (sometimes referred to as BET specific surface area) of the silica particles is preferably 10 $m^2/g$ or more, and more preferably 30 $m^2/g$ or more. When the specific surface area of the silica particles is 10 $m^2/g$ or more, a resin composition capable of exhibiting sufficiently high adhesive strength can be obtained.

Further, the specific surface area of the silica particles is preferably 350 $m^2/g$ or less, and more preferably 100 $m^2/g$ or less. When the specific surface area of the silica particles is 350 $m^2/g$ or less, silica is easily dispersed in the resin composition. Further, even when a small amount of silica particles is added, it is easy to increase the adhesive strength of the molded article of the obtained resin composition. Furthermore, the silica particles are easy to handle as a powder.

The upper limit value and lower limit value of the specific surface area of the silica particles can be arbitrarily combined.

In one aspect, the specific surface area of the silica particles is preferably 10 $m^2/g$ or more and 350 $m^2/g$ or less, and more preferably 30 $m^2/g$ or more and 100 $m^2/g$ or less.

In another aspect, the specific surface area of the silica particles may be 3.0 $m^2/g$ or more and 210 $m^2/g$ or less, or may be 35 $m^2/g$ or more and 210 $m^2/g$ or less.

The bulk density of the silica particles is preferably 0.05 $g/cm^3$ or more, and more preferably 0.10 $g/cm^3$ or more. When the bulk density of the silica particles is 0.05 $g/cm^3$ or more, it is easy to uniformly disperse the silica particles in the resin composition.

Further, the bulk density of the silica particles is preferably 1.5 $g/cm^3$ or less, and more preferably 1.0 $g/cm^3$ or less. When the bulk density of the silica particles is 1.5 $g/cm^3$ or less, classification in the preblending operation before melt-kneading can be suppressed. In addition, uneven distribution and aggregation of the silica particles can be suppressed during melt-kneading.

The upper limit value and lower limit value of the bulk density of the silica particles can be arbitrarily combined.

In one aspect, the bulk density of silica particles is preferably 0.05 $g/cm^3$ or more and 1.5 $g/cm^3$ or less, and more preferably 0.10 $g/cm^3$ or more and 1.0 $g/cm^3$ or less.

In another aspect, the bulk density of the silica particles may be 0.05 $g/cm^3$ or more and 0.75 $g/cm^3$ or less, or may be 0.05 $g/cm^3$ or more and 0.15 $g/cm^3$ or less.

In the present specification, the bulk density of the silica particles can be measured by the method described in JIS R 1628-1997.

[Other Components]

The resin composition of the present embodiment may contain at least one type of other components such as resins, fillers and additives, other than glass balloons, silica particles and thermoplastic resins, as long as the effects of the present invention are not impaired.

In one aspect, the content of other components is preferably from 0 to 50% by mass with respect to the total mass of the resin composition.

The filler may be a fibrous filler, a plate-like filler, or, other than the fibrous and plate-like fillers, a spherical or other particulate filler (excluding the aforementioned glass balloons, the aforementioned spherical particles and the aforementioned silica particles). Further, the filler may be an inorganic filler or an organic filler.

Examples of the fibrous inorganic filler include glass fibers, carbon fibers such as PAN-based carbon fibers and pitch-based carbon fibers, ceramic fibers such as silica fibers, alumina fibers and silica alumina fibers, or metal fibers such as stainless steel fibers. In addition, as examples of the fibrous inorganic filler, whiskers such as potassium titanate whiskers, barium titanate whiskers, wollastonite whiskers, aluminum borate whiskers, silicon nitride whiskers, and silicon carbide whiskers can also be mentioned.

Examples of the fibrous organic fillers include polyester fibers or aramid fibers.

Examples of the plate-like inorganic fillers include talc, mica, graphite, wollastonite, glass flakes, or barium sulfate. The mica may be muscovite, phlogopite, fluorophlogopite or tetrasilicic mica.

Examples of the particulate inorganic filler include alumina, titanium oxide, glass beads, boron nitride, silicon carbide or calcium carbonate.

The content of the filler may be from 0 to 100 parts by mass with respect to 100 parts by mass of the thermoplastic resin.

Examples of the additives include antioxidants, thermal stabilizers, ultraviolet absorbers, antistatic agents, surfactants, flame retardants or colorants. The content of the additive may be from 0 to 5 parts by mass with respect to 100 parts by mass of the thermoplastic resin.

Examples of resins other than thermoplastic resins include thermosetting resins such as phenol resins, epoxy resins, polyimide resins, and cyanate resins. The content of the resin other than the thermoplastic resin may be from 0 to 20 parts by mass with respect to 100 parts by mass of the thermoplastic resin.

According to the above configuration, a resin composition having a low specific gravity and capable of forming a molded product having a high adhesive strength can be obtained.

<Method for Producing Resin Composition>

The resin composition of the present embodiment can be obtained by mixing a thermoplastic resin, glass balloons, silica particles and optionally other components. The resin composition of the present embodiment is preferably prepared by melt-kneading the thermoplastic resin, the glass balloons, the silica particles and optionally other components with an extruder and extruding the resultant into a pellet form.

In the method for producing the resin composition of the present embodiment, the thermoplastic resin, the glass balloons and the silica particles may be mixed separately. Alternatively, the thermoplastic resin and the silica particles may be mixed first and then mixed with the glass balloons. Alternatively, the glass balloons and the silica particles may be mixed first and then mixed with the thermoplastic resin.

In one aspect, after mixing the above silica particles with at least one selected from the group consisting of a thermoplastic resin, glass balloons and other components used as required, the obtained mixture may be mixed with the remaining components of the above group.

As the extruder, one having a cylinder, at least one screw disposed in the cylinder, and at least one supply port provided in the cylinder is preferably used, and one further having at least one vent portion provided in the cylinder is more preferably used.

<Molded Product>

A molded product can be obtained from the resin composition of the present embodiment. As a molding method of the resin composition of the present embodiment, a melt molding method is preferable, and examples thereof include an injection molding method, an extrusion molding method such as a T-die method and an inflation method, a compression molding method, a blow molding method, a vacuum molding method and a press molding method. Among them, the injection molding method is preferable.

According to the present embodiment, a molded product having a high adhesive strength can be obtained. In the present specification, a value measured in accordance with ASTM D638 is adopted as the adhesive strength of a molded product unless otherwise specified below.

First, the resin composition is molded into an ASTM No. 4 dumbbell (thickness: 2.5 mm) using an injection molding machine ("PS40E1ASE" manufactured by Nissei Plastic Industrial Co., Ltd.). The molding conditions are set to a cylinder temperature of 360° C., a mold temperature of 130° C., and an injection speed of 40%.

Next, the ASTM No. 4 dumbbell is cut at the center of a neck portion, and the surface is thoroughly cleaned with acetone by removing dirt such as oil thereon and dried at room temperature (23° C.) for at least 1 hour. The test piece produced above is coated with Technodyne AH 8042KL (manufactured by Taoka Chemical Co., Ltd.) so that the adhesion area is 60 $mm^2$, and the neck portions are superposed and fixed with a clip, and then subjected to a curing treatment under air at a temperature of 110° C. for 60 minutes to prepare a test piece for adhesiveness evaluation.

The above test piece for adhesiveness evaluation is allowed to stand for at least 24 hours in a constant temperature and humidity chamber adjusted to 23° C. and RH 50% to adjust the state, and then an integrated value of shear tensile stress is measured at a tensile speed of 10 mm/min using a precision universal tester Autograph (manufactured by Shimadzu Corporation). The obtained integrated value of the shear tensile stress is taken as the adhesive strength of the molded product.

Examples of products and parts that are molded products of the resin composition of the present embodiment include bobbins such as optical pickup bobbins and transformer bobbins, relay parts such as relay cases, relay bases, relay sprues and relay armatures, connectors such as RIMMs, DDRs, CPU sockets, S/Os, DIMMs, Board to Board connectors, FPC connectors and card connectors, reflectors such as lamp reflectors and LED reflectors, holders such as lamp holders and heater holders, diaphragms such as speaker diaphragms, separation claws such as separation claws for photocopiers and separation claws for printers, camera module parts, switch parts, motor parts, sensor parts, hard disk drive parts, eating utensils such as ovenware, vehicle parts, aircraft parts, or sealing members such as semiconductor element sealing members and coil sealing members.

In one aspect, the resin composition of the present invention includes:
 a liquid crystalline polyester,
 glass balloons, and
 silica particles;
 wherein the aforementioned liquid crystalline polyester is
 preferably, a liquid crystalline polyester containing a repeating unit derived from 4-hydroxybenzoic acid, a repeating unit derived from 4,4'-dihydroxybiphenyl, a repeating unit derived from terephthalic acid and a repeating unit derived from isophthalic acid, or a liquid crystalline polyester containing a repeating unit derived from 6-hydroxy-2-naphthoic acid, a repeating unit derived from 2,6-naphthalenedicarboxylic acid, a repeating unit derived from terephthalic acid and a repeating unit derived from hydroquinone;
 an arithmetic average particle size of the aforementioned glass balloons is 5 μm or more and 500 μm or less, preferably 10 μm or more and 200 μm or less, and more preferably 50 μm or more and 70 μm or less;
 in the aforementioned glass balloons, based on the cumulative volume distribution diagram of the particle size distribution of the aforementioned glass balloons,
 the particle size D10 at a cumulative percentage of 10% from the small diameter side is 5 μm or more and 30 μm or less, preferably 10 μm or more and 25 μm or less, and more preferably 20 μm or more and 22 μm or less,
 the particle size D50 at a cumulative percentage of 50% from the small diameter side is 5 μm or more and 200 μm or less, preferably 10 μm or more and 100 μm or less, and more preferably 40 μm or more and 50 μm or less,
 the particle size D90 at a cumulative percentage of 90% from the small diameter side is 35 μm or more and 180 μm or less, preferably 40 μm or more and 170 μm or less, and more preferably 100 μm or more and 160 μm or less;
 an arithmetic average particle size of primary particles of the aforementioned silica particles is 7 nm or more and 2,000 nm or less, preferably 20 nm or more and 1,000 nm or less, and more preferably 50 nm or more and 400 nm or less;
 in the aforementioned silica particles, based on the cumulative volume distribution diagram of the particle size distribution of the aforementioned silica particles,
 the particle size D10' at a cumulative percentage of 10% from the small diameter side is 1 nm or more and 1,700 nm or less, preferably 3 nm or more and 500 nm or less, or may be 4 nm or more and 1,700 nm or less, or may be 4 nm or more and 23 nm or less,
 the particle size D50' at a cumulative percentage of 50% from the small diameter side is 7 nm or more and 2000 nm or less, preferably 20 nm or more and 1,000 nm or less, or may be 8 nm or more and 2000 nm or less, or may be 8 nm or more and 51 nm or less,
 the particle size D90' at a cumulative percentage of 90% from the small diameter side is 10 nm or more and 2,500 nm or less, preferably 70 nm or more and 1,800 nm or less, or may be 12 nm or more and 2,228 nm or less, or may be 12 nm or more and 95 nm or less;
 the content of the aforementioned liquid crystalline polyester is preferably 70% by mass or more and 90% by mass or less with respect to the total mass of the aforementioned resin composition;
 the ratio of the content of the aforementioned glass balloons is 10% by mass or more and 30% by mass or less, preferably 15% by mass or more and 30% by mass or less, more preferably 15% by mass or more and 25% by mass or less, and particularly preferably 20% by mass or more and 25% by mass or less, when the total content of the aforementioned liquid crystalline polyester and the aforementioned glass balloons is 100% by mass; and
 the ratio of the content of the silica particles is 0.02 parts by mass or more and 5 parts by mass or less, and preferably 0.10 parts by mass or more and 2 parts by mass or less, when the total content of the aforementioned liquid crystalline polyester and the aforementioned glass balloons is 100 parts by mass.

Furthermore, in the aforementioned resin composition,
 the flow starting temperature of the liquid crystalline polyester is preferably 270° C. or higher and 400° C. or lower, and more preferably 280° C. or higher and 360° C. or lower.

Furthermore, in the aforementioned resin composition,
 the pressure resistance of the aforementioned glass balloons is preferably 20 MPa or more and 200 MPa or less, more preferably 50 MPa or more and 200 MPa or less, and particularly preferably 80 MPa or more and 200 MPa or less;
 the specific surface area of the aforementioned silica particles is preferably 10 m$^2$/g or more and 350 m$^2$/g or less, more preferably 30 m$^2$/g or more and 100 m$^2$/g or less, or may be 3.0 m$^2$/g or more and 210 m$^2$/g or less, or may be 35 m$^2$/g or more and 210 m$^2$/g or less; and
 the bulk density of the aforementioned silica particles is preferably 0.05 g/cm$^3$ or more and 1.5 g/cm$^3$ or less, and more preferably 0.10 g/cm$^3$ or more and 1.0 g/cm$^3$ or less, or may be 0.05 g/cm$^3$ or more and 0.75 g/cm$^3$ or less, or may be 0.05 g/cm$^3$ or more and 0.15 g/cm$^3$ or less.

Furthermore, in the aforementioned resin composition,
 the hollow volume ratio of the aforementioned glass balloons is preferably 60% or more and 80% or less.

EXAMPLES

The present invention will be described below based on examples. However, the present invention is not limited to these examples. It should be noted that in the present example, a liquid crystalline polyester was used as a thermoplastic resin. Various measurements were performed as follows.

[Flow Starting Temperature of Liquid Crystalline Polyester]

A flow starting temperature of the liquid crystalline polyester was measured using a flow characteristic evaluation apparatus ("Flowtester Model CFT-500" manufactured by Shimadzu Corporation).

First, about 2 g of a liquid crystalline polyester was filled into a capillary rheometer equipped with a die having an inner diameter of 1 mm and a length of 10 nm. Next, the liquid crystalline polyester was melted and extruded from a nozzle while raising the temperature at a rate of 4° C./min under a load of 9.8 MPa (100 kgf/cm$^2$).

At this time, a temperature at which the melt viscosity was 4,800 Pa·s (48,000 poise) was measured, and this was used as the flow starting temperature of the liquid crystalline polyester.

[Arithmetic Average Particle Size of Primary Particles of Silica Particles]
(Measurement 1)

An image of silica particles before mixing was taken by using a TEM (JEM2200FS, manufactured by JEOL Ltd.), a predetermined number of particles was randomly selected, and an average value of particle sizes (Feret diameters) of the selected particles was used as an arithmetic average particle size of primary particles of the silica particles. It should be noted that in the measurement of silica (1) described later, 474 particles were used. Moreover, in the measurement of silica (2) described later, 490 particles were used.

(Measurement 2)

In a state where silica particles before mixing were dispersed in water, a particle size distribution of the silica particles was obtained using a laser diffraction/scattering type particle size distribution measuring device ("LA-950" manufactured by Horiba, Ltd.). The arithmetic average particle size of the silica particles was calculated based on the obtained cumulative volume distribution diagram of the particle size distribution of the silica particles.

It should be noted that the particle size range of the particles for which the particle size distribution of the silica particles was obtained in the above measurement was set to 0.01 µm or more and 10 µm or less.

[D10', D50' and D90' of Silica Particles]

Based on the cumulative distribution diagram of the particle size distribution of the silica particles obtained in the above "Measurement 2", the particle size at a cumulative percentage of 10% (D10'), the particle size at a cumulative percentage of 50% (D50'), and the particle size at a cumulative percentage of 90% (D90') from the small diameter side were calculated.

[Bulk Density of Silica Particles]

The bulk density of silica particles before mixing was measured by the method described in JIS R 1628-1997.

[Arithmetic Average Particle Size of Glass Balloons]

The arithmetic average particle size of the glass balloons before mixing was determined by using a laser diffraction/scattering type particle size distribution measuring device ("LA-950" manufactured by Horiba, Ltd.) in the same manner as the arithmetic average particle size of the silica particles. It should be noted that the particle size range of the particles for which the particle size distribution of the glass balloons was obtained in the above measurement was set to 1 µm or more and 1,000 µm or less.

[D10, D50 and D90 of Glass Balloons]

Based on the cumulative distribution diagram of the particle size distribution of the glass balloons obtained in the above measurement, the particle size at a cumulative percentage of 10% (D10), the particle size at a cumulative percentage of 50% (D50), and the particle size at a cumulative percentage of 90% (D90) from the small diameter side were calculated.

Production Examples

Production Example 1 (Production of Liquid Crystalline Polyester (1))

994.5 g (7.2 mol) of parahydroxybenzoic acid, 446.9 g (2.4 mol) of 4,4'-dihydroxybiphenyl, 299.0 g (1.8 mol) of terephthalic acid, 99.7 g (0.6 mol) of isophthalic acid, and 1,347.6 g (13.2 mol) of acetic anhydride were charged, and 0.2 g of 1-methylimidazole was added to a reactor equipped with a stirrer, a torque meter, a nitrogen gas inlet tube, a thermometer and a reflux condenser, and the inside of the reactor was thoroughly replaced with nitrogen gas. Then, the resulting mixture was heated to 150° C. over 30 minutes under a nitrogen gas stream, and refluxed for 1 hour while maintaining the same temperature. Thereafter, the temperature was raised to 320° C. over 2 hours and 50 minutes while distilling off acetic acid produced as a byproduct and unreacted acetic anhydride, and the same temperature was maintained until an increase in torque was observed to obtain a prepolymer.

The obtained prepolymer was cooled to room temperature to be solidified, and pulverized with a coarse grinder, and the obtained powder was then subjected to solid phase polymerization by being heated from room temperature to 250° C. over 1 hour in a nitrogen atmosphere, heated from 250° C. to 285° C. over 5 hours, and held at the same temperature for 3 hours. The flow starting temperature of the liquid crystalline polyester obtained by cooling was 330° C.

Production Example 2 (Production of Liquid Crystalline Polyester (2))

1,034.99 g (5.5 mol) of 6-hydroxy-2-naphthoic acid, 378.33 g (1.75 mol) of 2,6-naphthalenedicarboxilic acid, 83.07 g (0.5 mol) of terephthalic acid, 272.52 g (2.475 mol: 0.225 mol in excess with respect to the total amount of 2,6-naphthalenedicarboxylic acid and terephthalic acid) of hydroquinone, and 1,226.87 g (12 mol) of acetic anhydride were charged, and 0.17 g of 1-methylimidazole as a catalyst was added to a reactor equipped with a stirrer, a torque meter, a nitrogen gas inlet tube, a thermometer and a reflux condenser, and the inside of the reactor was thoroughly replaced with nitrogen gas.

Thereafter, the resulting mixture was heated from room temperature to 145° C. over 15 minutes while being stirred in a nitrogen gas stream and refluxed at 145° C. for 1 hour.

Subsequently, the temperature was raised from 145° C. to 310° C. over 3.5 hours while distilling off acetic acid as a by-product and unreacted acetic anhydride, and after maintaining the temperature at 310° C. for 3 hours, the contents were taken out and cooled to room temperature.

The obtained solid was pulverized with a grinder to a particle size of 0.1 to 1 mm, and was then subjected to solid phase polymerization by raising the temperature from room temperature to 250° C. over 1 hour in a nitrogen atmosphere, raising the temperature from 250° C. to 310° C. over 10 hours, and holding at 310° C. for 5 hours. After the solid phase polymerization, the resultant was cooled to obtain a liquid crystalline polyester in the form of a powder. The flow starting temperature of the obtained liquid crystalline polyester was 322° C.

In the present example, the following materials were used as the silica particles. It should be noted that the nominal value provided by the manufacturer was adopted as the BET specific surface area.

Silica (1): AEROSIL (registered trademark) RX-300 manufactured by Nippon Aerosil Co., Ltd. The arithmetic average particle size of the primary particles of the silica particles measured by the above-mentioned "Measurement 1" was 8.3 nm.

The silica particles had a D10' of 4.4 nm, a D50' of 8.5 nm, and a D90' of 12.5 nm.

The bulk density of the silica particles was 0.05 g/cm$^3$.

The BET specific surface area of the silica particles was 210 m$^2$/g.

Silica (2): AEROSIL (registered trademark) RX-50 manufactured by Nippon Aerosil Co., Ltd. The arithmetic average particle size of the primary particles of the silica particles measured by the above-mentioned "Measurement 1" was 56.7 am.

The silica particles had a D10' of 22.5 am, a D50' of 50.9 nm, and a D90' of 94.0 nm.

The bulk density of the silica particles was 0.13 g/cm³.

The BET specific surface area of the silica particles was 35 m²/g.

Silica (3): SFP-20M manufactured by Denka Co., Ltd. The arithmetic average particle size of the primary particles of the silica particles measured by the above-mentioned "Measurement 2" was 999 nm.

The silica particles had a D10' of 479 nm, a D50' of 964 nm, and a D90' of 1,521 nm.

The bulk density of the silica particles was 0.48 g/cm³.

The BET specific surface area of the silica particles was 11.3 m²/g.

Silica (4): Admafine silica SO—C5 manufactured by Admatechs Co., Ltd. The arithmetic average particle size of the primary particles of the silica particles measured by the above-mentioned "Measurement 2" was 1,940 nm.

The silica particles had a D10' of 1,657 nm, a D50' of 1,924 nm and a D90' of 2,228 nm.

The bulk density of the silica particles was 0.73 g/cm³.

The BET specific surface area of the silica particles was from 3.0 to 5.0 m²/g.

In the present example, the following materials were used as the glass balloons.

Glass balloons: Sphericel (registered trademark) 34P30 manufactured by Potters-Ballotini Co., Ltd. The arithmetic average particle size of the glass balloons measured using the above method was 68 μm. Further, the glass balloons had a D10 of 21 μm, a D50 of 46 μm, and a D90 of 151 μm.

[Production of Resin Composition]

Examples 1 to 12, Comparative Examples 1 to 9

A mixture obtained by mixing the liquid crystalline polyester, glass balloons and silica particles in the proportions shown in Tables 1 to 5 was supplied to a co-rotating twin screw extruder with a screw diameter of 30 mm ("PCM-30" manufactured by Ikegai Ironworks Corp), melt-kneaded and pelletized, thereby obtaining pellets of Examples 1 to 12 and Comparative Examples 1 to 9. Here, the obtained pellet corresponds to the "resin composition" in the present invention. The numerical values in Tables 1 to 5 are expressed in the unit "parts by mass".

[Specific Gravity of Molded Product of Resin Composition]

Using an automatic specific gravity measuring device ("ASG-320K" manufactured by Kanto Measure Co., Ltd.), the specific gravity of the molded ASTM No. 4 dumbbell (molded product) was measured under a condition of 23° C.

[Adhesive Strength of Molded Product of Resin Composition]

First, the resin composition was molded into an ASTM No. 4 dumbbell (thickness: 2.5 mm) using an injection molding machine ("PS40E1ASE" manufactured by Nissei Plastic Industrial Co., Ltd.). The molding conditions were set to a cylinder temperature of 360° C., a mold temperature of 130° C., and an injection speed of 40%.

Next, the ASTM No. 4 dumbbell was cut at the center of a neck portion, and the surface is thoroughly cleaned with acetone by removing dirt such as oil thereon and dried at room temperature (23° C.) for at least 1 hour. The test piece produced above was coated with Technodyne AH 8042KL so that the adhesion area was 60 mm², and the neck portions were superposed and fixed with a clip, and then subjected to a curing treatment under air at a temperature of 110° C. for 60 minutes to prepare a test piece for adhesiveness evaluation.

The above test piece for adhesiveness evaluation was allowed to stand for at least 24 hours in a constant temperature and humidity chamber adjusted to 23° C. and RH 50% to adjust the state, and then an integrated value of shear tensile stress was measured at a tensile speed of 10 mm/min using a precision universal tester Shimadzu Autograph (manufactured by Shimadzu Corporation). The obtained integrated value of the shear tensile stress was taken as the adhesive strength of the molded product.

The resin compositions of Examples 1 to 9 and Comparative Examples 1 to 6 using the liquid crystalline polyester (1) were evaluated according to the following criteria 1. The evaluation results are shown in Tables 1 and 2.

(Criteria 1)

A: Cases where the specific gravity of the molded product of the resin composition is 1.29 or less, and the adhesive strength of the molded product is improved by 5% or more as compared with the resin composition of Comparative Example 4.

B: Cases where the specific gravity of the molded product of the resin composition is 1.29 or less, and the adhesive strength of the molded product is improved by 3% or more and less than 5% as compared with the resin composition of Comparative Example 4.

C: Cases other than the above

The resin compositions of Example 10 and Comparative Example 7 using the liquid crystalline polyester (2) were evaluated according to the following criteria 2. The evaluation results are shown in Table 3.

(Criteria 2)

A': Cases where the specific gravity of the molded product of the resin composition is 1.29 or less, and the adhesive strength of the molded product is improved by 5% or more as compared with the resin composition of Comparative Example 7.

B': Cases where the specific gravity of the molded product of the resin composition is 1.29 or less, and the adhesive strength of the molded product is improved by 3% or more and less than 5% as compared with the resin composition of Comparative Example 7.

C': Cases other than the above

The resin compositions of Example 11 and Comparative Example 8 using the liquid crystalline polyester (1) were evaluated according to the following criteria 3. The evaluation results are shown in Table 4.

(Criteria 3)

A": Cases where the specific gravity of the molded product of the resin composition is 1.29 or less, and the adhesive strength of the molded product is improved by 5% or more as compared with the resin composition of Comparative Example 8.

B": Cases where the specific gravity of the molded product of the resin composition is 1.29 or less, and the adhesive strength of the molded product is improved by 3% or more and less than 5% as compared with the resin composition of Comparative Example 8.

C": Cases other than the above

The resin compositions of Example 12 and Comparative Example 9 using the liquid crystalline polyester (1) were evaluated according to the following criteria 4. The evaluation results are shown in Table 5.

(Criteria 4)

A'": Cases where the specific gravity of the molded product of the resin composition is 1.32 or less, and the adhesive strength of the molded product is improved by 5% or more as compared with the resin composition of Comparative Example 9.

B′′′: Cases where the specific gravity of the molded product of the resin composition is 1.32 or less, and the adhesive strength of the molded product is improved by 3% or more and less than 5% as compared with the resin composition of Comparative Example 9.

C′′′: Cases other than the above

TABLE 1

|  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Liquid crystalline polyester (1) | | 80 | 80 | 80 | 80 | 80 | 80 | 80 | 80 | 80 |
| Glass balloons | | 20 | 20 | 20 | 20 | 20 | 20 | 20 | 20 | 20 |
| Silica particles | Silica (1) | — | — | 2.0 | — | — | — | — | — | — |
| | Silica (2) | 0.02 | 0.4 | — | — | 1.0 | 2.0 | 5.0 | — | — |
| | Silica (3) | — | — | — | — | — | — | — | 0.4 | 2.0 |
| | Silica (4) | — | — | — | 2.0 | — | — | — | — | — |
| Specific gravity | | 1.19 | 1.18 | 1.18 | 1.20 | 1.22 | 1.18 | 1.21 | 1.22 | 1.21 |
| Adhesive strength (N) | | 180 | 181 | 183 | 177 | 182 | 185 | 193 | 177 | 184 |
| Evaluation | | A | A | A | A | A | A | A | A | A |

TABLE 2

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Liquid crystalline polyester (1) | | 100 | 100 | 100 | 80 | 80 | 80 |
| Glass balloons | | — | — | — | 20 | 20 | 20 |
| Silica particles | Silica (2) | — | 0.02 | 0.4 | — | 10.0 | — |
| | Silica (4) | — | — | — | — | — | 10.0 |
| Specific gravity | | 1.39 | 1.39 | 1.39 | 1.27 | — | — |
| Adhesive strength (N) | | 112 | 114 | 113 | 168 | — | — |
| Evaluation | | C | C | C | Criteria 1 | Granulation was not possible | Granulation was not possible |

TABLE 3

|  |  | Ex. 10 | Comp. Ex. 7 |
|---|---|---|---|
| Liquid crystalline polyester (2) | | 80 | 80 |
| Glass balloons | | 20 | 20 |
| Silica particles | Silica (2) | 2.0 | — |
| Specific gravity | | 1.22 | 1.21 |
| Adhesive strength (N) | | 155 | 146 |
| Evaluation | | A′ | Criteria 2 |

TABLE 4

|  |  | Ex. 11 | Comp. Ex. 8 |
|---|---|---|---|
| Liquid crystalline polyester (1) | | 70 | 70 |
| Glass balloons | | 30 | 30 |
| Silica particles | Silica (1) | — | — |
| | Silica (2) | 0.6 | — |
| Specific gravity | | 1.15 | 1.15 |
| Adhesive strength (N) | | 154 | 148 |
| Evaluation | | B′′ | Criteria 3 |

TABLE 5

|  |  | Ex. 12 | Comp. Ex. 9 |
|---|---|---|---|
| Liquid crystalline polyester (1) | | 90 | 100 |
| Glass balloons | | 10 | — |
| Silica particles | Silica (1) | 0.4 | 0.4 |
| | Silica (2) | — | — |
| Specific gravity | | 1.32 | 1.32 |
| Adhesive strength (N) | | 140 | 115 |
| Evaluation | | A′′′ | Criteria 4 |

From the above results, it was confirmed that the present invention is useful.

INDUSTRIAL APPLICABILITY

According to the present invention, it is possible to provide a resin composition having a low specific gravity and capable of forming a molded product having a high adhesive strength, and the invention is therefore extremely useful industrially.

The invention claimed is:

1. A resin composition comprising:
   a thermoplastic resin;
   glass balloons; and
   silica particles,
   wherein a ratio of a content of said glass balloons is 10% by mass or more and 30% by mass or less when a total content of said thermoplastic resin and said glass balloons is 100% by mass,
   wherein a ratio of a content of said silica particles is 0.02 parts by mass or more and 5 parts by mass or less when the total content of said thermoplastic resin and said glass balloons is 100 parts by mass,
   wherein a value of $D90'/D10'$ in the silica particles is 1.0 or more and 5.0 or less,
   wherein the value of $D90'$ is based on a cumulative volume distribution diagram of a particle size distribution of the silica particles, a particle size at a cumulative percentage of 90% from a small diameter side, and wherein the value of D10' is based on a cumulative volume distribution diagram of a particle size distribution of the silica particles, the particle size at a cumulative percentage of 10% from the small diameter side, wherein said thermoplastic resin is a liquid crystalline polyester.

2. The resin composition according to claim 1, wherein an arithmetic average particle size of primary particles of said silica particles is 7 nm or more and 2,000 nm or less.

3. The resin composition according to claim 2, wherein an arithmetic average particle size of said glass balloons is 5 μm or more and 500 μm or less.

4. The resin composition according to claim 1, wherein an arithmetic average particle size of said glass balloons is 5 μm or more and 500 μm or less.

* * * * *